United States Patent [19]

Shepherd

[11] Patent Number: 4,509,288
[45] Date of Patent: Apr. 9, 1985

[54] SHELLFISH TRAP

[75] Inventor: C. Barrett Shepherd, Houston, Tex.

[73] Assignee: C. E. Shepherd Company, Inc., Houston, Tex.

[21] Appl. No.: 435,228

[22] Filed: Oct. 19, 1982

[51] Int. Cl.³ .............................................. A01K 69/08
[52] U.S. Cl. ..................................................... 43/102
[58] Field of Search ................. 43/100, 102, 103, 104, 43/105

[56] References Cited

U.S. PATENT DOCUMENTS

| | | | |
|---|---|---|---|
| 2,760,297 | 8/1956 | Buyken | 43/105 |
| 3,691,667 | 9/1972 | Illinger | 43/100 |
| 3,795,073 | 3/1974 | Olsen | 43/100 |
| 3,906,654 | 9/1975 | Leslie | 43/100 |

FOREIGN PATENT DOCUMENTS

| | | | |
|---|---|---|---|
| 593841 | 5/1959 | Italy | 43/102 |
| 49964 | 12/1917 | Sweden | 43/105 |

Primary Examiner—Nicholas P. Godici
Assistant Examiner—Marc Hodak
Attorney, Agent, or Firm—Schwartz, Jeffery, Schwaab, Mack, Blumenthal & Koch

[57] ABSTRACT

The trap comprises a circumferential body portion formed of mesh material and having an open top and an open bottom. A top member is connected to the body portion and has a planar portion covering the open top of the body portion. A bottom member is connected to the body portion and has a planar portion covering the open bottom of the body portion. A first opening is formed in the trap and covered by a first closure member. The first opening is sized so as to allow a fisherman to place bait within the trap or remove shellfish caught. A second opening is formed in the trap and contains an elongated passage formed of mesh material. A trapdoor is connected to the inner end of the passage to permit a shellfish to enter the trap but inhibit the shellfish from exiting.

8 Claims, 2 Drawing Figures

SHELLFISH TRAP

BACKGROUND OF THE INVENTION

1. Field of the Invention

This invention relates to traps for capturing and retaining shellfish, and more particularly to traps which are designed to capture lobsters and crabs.

2. Discussion of Related Art

The value of shellfish as nutritious food has been well known for many years. However, in recent years many more shellfish have been consumed than ever before. This is partly due to the relatively high cost of beef and other farm animals raised for food and also due to the increased general awareness of the high nutritional value of shellfish. As a consquence of this greater demand, there has been a large increase in number of shellfish caught each year, both for commercial sale and for personal consumption.

The traditional method of capturing shellfish is to utilize traps having a doorway which a shellfish can easily enter through, but cannot find its way back out of. These traps are placed at strategic locations in an area known to be inhabited by shellfish and are marked with bouys or the like. Periodically, the fisherman raises the traps and empties the catch either through an end panel of the trap or a special door designed for this purpose.

Prior known shellfish traps are usually quite cumbersome and difficult to carry from one location to another. Furthermore, the construction of these traps is quite complicated and can be very expensive. Accordingly, a need has arisen for a shellfish trap which is relatively inexpensive to manufacture and can be easily transported from one location to another.

SUMMARY OF THE INVENTION

One object of the present invention is to provide a shellfish trap which can effectively capture shellfish and which permits the shellfish to be removed from the trap with relative ease.

Another object of the present invention is to provide a shellfish trap which is relatively simple to manufacture and therefore relatively inexpensive to produce.

A further object of the present invention is to provide a shellfish trap which can be produced in various sizes to accommodate any desired shellfish, such as lobster, dungeness crab, blue crab, etc., by merely varying the size of a single component of the trap.

An even further object of the present invention is to provide a shellfish trap which can be broken down into its component parts by easy shipment and assembly by the user.

In accordance with the above and other objects, the present invention is a shellfish trap which comprises a circumferential body portion formed of mesh material and having an open top and an open bottom. A top member is connected to the body portion and has a planar portion covering the top of the body portion. A bottom member is also connected to the body portion and has a planar portion which covers the bottom of the body portion. A first opening is formed in the trap and a first closure member is provided. A means for connecting the first closure member over the first opening is provided to prevent either unaided entry or exit of a shellfish through the first opening but to permit a fisherman to remove shellfish from the trap or to place bait in the trap. A second opening is formed in the trap and an elongated passage formed of mesh material is connected to be aligned with the second opening and to extend inwardly of the trap. A trapdoor is connected to the inner end of the passage to permit a shellfish to enter the trap but to inhibit the shellfish from exiting.

In accordance with other aspects of the invention, the first closure member is held over the first opening by a stretch cord which extends from the closure member to the top portion of the trap.

The trapdoor comprises a door formed of mesh material hinged along a top edge thereof to a top surface of the passage.

The body portion comprises an elongated piece of mesh material connected at the longitudinal ends thereof to form the circumferential member.

The top member comprises a planar piece of material having a plurality of corners in which each of the corners is folded to form a triangular portion. The triangular portions are then connected to the body portion by crimpable clips. The bottom member similarly comprises a planar piece of mesh material having a plurality of corners wherein each of the corners is folded to form a triangular portion. The triangular portions are connected to the body portion by crimpable clips.

BRIEF DESCRIPTION OF THE DRAWINGS

The above and other objects of the present invention will become more readily apparent as the invention is more fully disclosed in the detailed description to follow, reference being had to the accompanying drawings in which like reference numerals represent like parts throughout, and in which.

DETAILED DESCRIPTION OF THE PREFERRED EMBODIMENT

Figure 1:
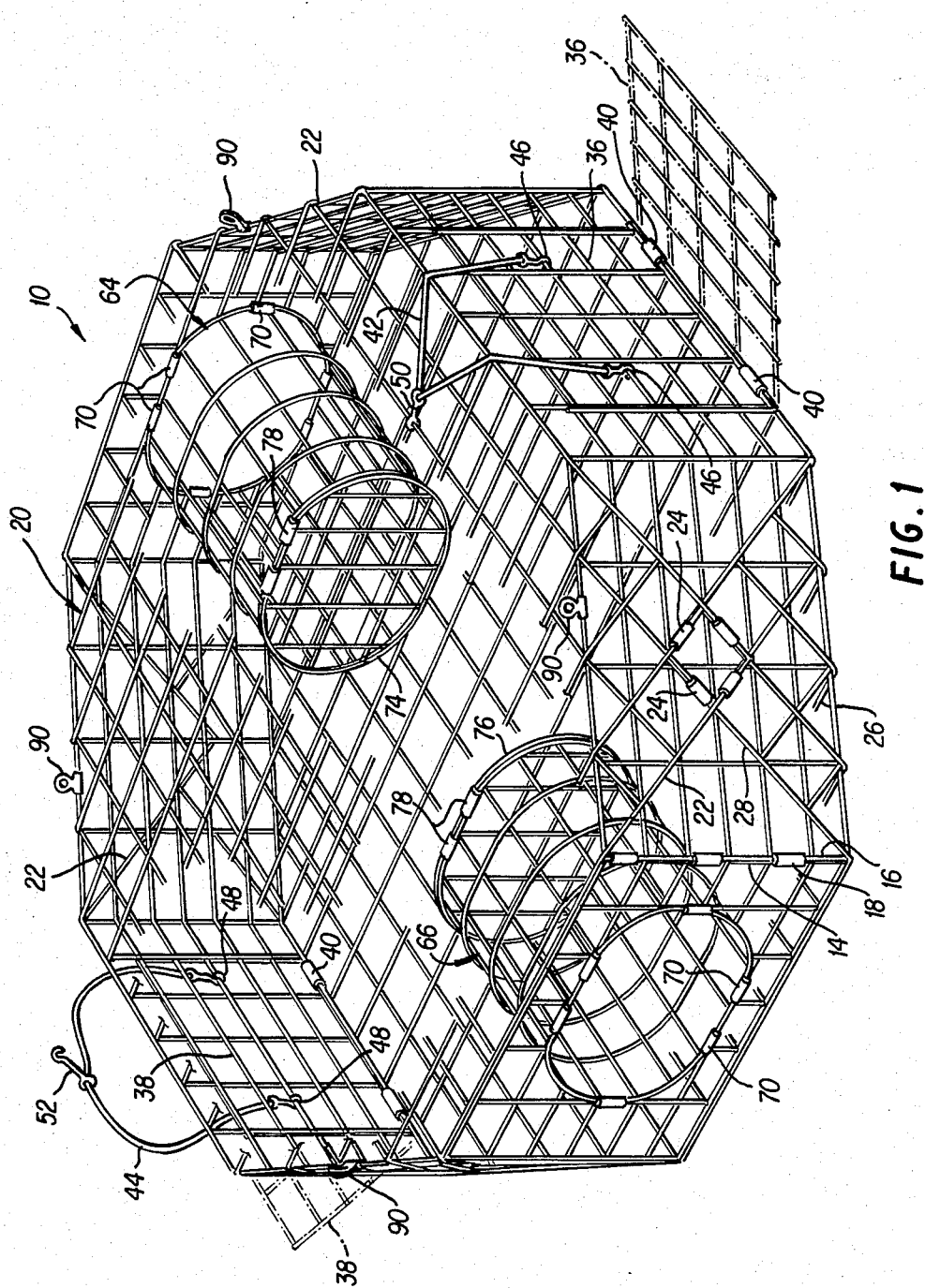
FIG. 1 is a perspective view of the shellfish trap of the present invention.
Figure 2:
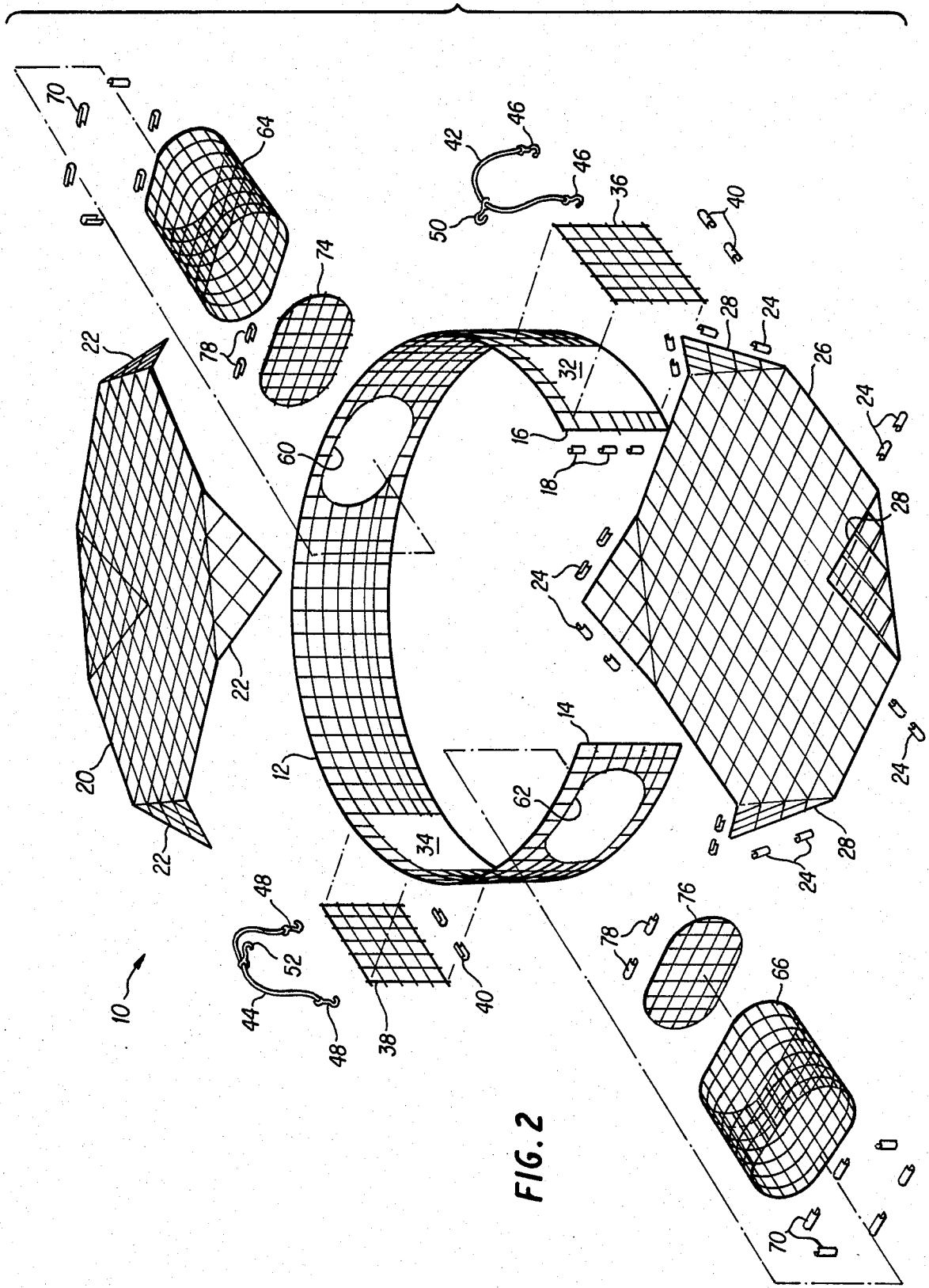
FIG. 2 is an exploded perspective view of the shellfish trap of FIG. 1.

Referring to FIGS. 1 and 2, it will be seen that trap 10 comprises a generally circumferential body portion 12 which can be formed of wire mesh material or any other sturdy mesh material. Body portion 12 can be formed as shown in FIG. 2 by attaching the ends 14 and 16 of an elongated piece of mesh material by the use of crimpable clips 18. In FIG. 2, the body portion 12 is shown to be generally circular, but will preferably be bent at eight corners to form an octagonal shape, as shown in FIG. 1. Alternatively, body portion 12 can be formed of eight separate body panels which are connected at their ends to form the octagonal shape.

A top member 20 is formed from a substantially planar piece of mesh material similar to that from which body portion 12 is formed. Top member 20 should be generally rectangular, and preferably square. The corners of the square mesh material are bent downwardly to form depending triangular portions 22 which are placed alongside of respective panels of the octagonal shaped body portion 12. Triangular portions 22 are then attached to the body portion 12 by a plurality of crimpable clips 24 which hold the top portion 20 in tight engagement with the body portion 12. A bottom portion 26 is similarly formed from a square piece of mesh material, the corners of which are bent upwardly to form raised triangular portions 28. Triangular portions 28 extend upwardly along respective panels of body portion 12 and are secured thereto by the same crimpable clips 24 as are used to hold triangular portion 22.

In order that trap 10 is sufficiently sturdy to withstand handling when assembled, triangular portions 22 and 28 are positioned so that they overlap one another. In this manner, a single set of clips 24 can be used to hold the triangular portions 22 and 28 to body portion 12. This construction produces a relatively rigid configuration in which all of the main components are interconnected.

The size of body portion 12 can be adjusted to accommodate any size shellfish such as lobsters, dungeness crabs, blue crabs, or the like, by varying the size of body portion 12. The size of body portion 12 can be varied by simply increasing or decreasing the width of the elongated mesh material from which the body portion is formed. Top portion 20 and bottom portion 26 can be varied to accommodate the height of the body portion by simply varying the amount of overlap of the top and bottom triangles, ranging from full overlap to as small as three meshes. Accordingly, when manufacturing the trap of the present invention, it is only necessary to provide varying sized body portions in order to accommodate all potential customers.

Body portion 12 includes a pair of opposed openings 32 and 34 which are formed large enough to allow bait to be placed within the trap and to permit the shellfish to be easily removed from the trap. Covering doors 36 and 38 are hingedly mounted to the bottom edges of openings 32 and 34, respectively, by the use of crimpable connectors 40. Accordingly, when not held closed, doors 36 and 38 will swing downwardly to allow a fisherman to either place bait within the trap or easily remove the shellfish caught. In order to keep doors 36 and 38 closed so a captured shellfish cannot escape, a pair of stretch cords 42 and 44 are provided. Stretch cords 42 and 44 have hooked ends 46 and 48, respectively, and hooks 50 and 52 which are connected to the center of the straps, respectively. As shown in FIG. 1, straps 42 and 44 are connected from trapdoors 36 and 38, respectively, to top portion 20 to hold these doors closed.

A second pair of openings 60 and 62 are also formed in body portion 12. Elongated throat type passages 64 and 66 are connected to openings 60 and 62, respectively, and extend inwardly therefrom. Throat passages 64 and 66 are formed from similar mesh material as the top, bottom and body portions of the trap 10. Each throat passage 64, 66 is formed from a single elongated piece of mesh material which is bent into an oval shape and has its longitudinal ends connected together. The outer end of the throat passageways 64 and 66 are connected to the periphery of openings 60 and 62, respectively, by the use of crimpable clips 70. At the inner end of passages 64 and 66, there are connected trapdoors 74 and 76, respectively. Trapdoors 74 and 76 are merely planar portions of mesh material similar to that from which the rest of the trap is formed. These portions of mesh material are cut into an oval shape to conform to the shape of the associated passage. Trapdoors 74 and 76 are connected by crimpable clips 78 along their top edges of the top edges of the associated passage. In this manner, trapdoors 74 and 76 will hang down over the inner opening of the associated passages by their own weight but can easily be moved by an entering shellfish which simply pushes the trapdoor out of its way. However, once within the trap, the shellfish cannot exit since any force directly applied against the trapdoor will cause the trapdoor to close to a greater extent.

As can be understood from the foregoing description, the shellfish trap 10 of the present invention is designed to use a minimum number of components which interfit in an optimum manner. The size of the trap can be varied quite easily and the trap can be shipped in a disassembled manner thus facilitating movement thereof. Additionally, a group of eyelets 90 are shown attached to the upper edges of body portion 12 in FIG. 1. These eyelets can be used to connect lines to the trap for raising or lowering the trap in deep water.

In use, a manufacturer may produce the trap quite easily by simply cutting the desired size pieces and bending the corners of the top and bottom portions 20 and 26, respectively. The trap may be stocked as separate components and may be sold either as an entire trap or the pieces may be sold for replacement parts. Also, the number of components stocked may be held to a minimum because the top portion 20 and bottom portion 26 can be used for traps of different size. The traps may be shipped in their component parts either with the top and bottom portions bent already or as a completely flat package with directions instructing the customer to bend the corners of the top and bottom portions. This forms a relatively compact package which can be shipped with a minimum of expense. Once received, the customer can simply attach the ends of the body portion 12 and bend that body portion to form an octagonal shape, bend the corners of the top portion 22 and bottom portion 26 and attach all of the components with the clips provided, as discussed above.

The foregoing description is provided for the purpose of illustrating the present invention, but is not considered to limit the scope thereof in any manner. Obviously, numerous modifications, additions or other changes can be made to the present invention without departing from the scope thereof, as set forth in the appended claims.

What is claimed is:

1. A shellfish trap comprising:
   a circumferential body portion formed of mesh material and having an open top and an open bottom;
   a top member connected to said body portion, said top member having a planar portion covering said open top of said body portion and depending portions overlapping said body;
   a bottom member connected to said body portion, said bottom member having a planar portion covering the open bottom of said body portion and upwardly extending portions overlapping, respectively, said depending portions and attached to said depending portions to directly connect said top member to said bottom member;
   a first opening formed in said trap;
   a first closure member;
   means for connecting said first closure member over said first opening to prevent either unaided entry or exit of a shellfish through said first opening;
   a second opening formed in said trap;
   an elongated passage formed of mesh material connected to be aligned with said second opening and to extend inwardly of said trap; and
   trapdoor means connected to the inner end of said passage to permit a shellfish to enter said trap but to inhibit the shellfish from exiting.

2. The trap as set forth in claim 1, wherein said connecting means comprises a stretch cord and said first closure member is hinged along a bottom edge thereof to said body portion, said stretch cord being connected between said first closure member and said top member.

3. The trap as set forth in claim 1, wherein said trapdoor means comprises a door formed of mesh material hinged along a bottom edge thereof to a top surface of said passage whereby said door hangs from said passage.

4. The trap as set forth in claim 1, wherein said body portion comprises an elongated piece of mesh material connected at the longitudinal ends thereof.

5. The trap as set forth in claim 1, wherein said top member comprises a planar piece of mesh material having a plurality of corners, said planar piece of mesh material being folded downward at least at some of said corners to form said depending portions as triangular portions, said depending triangular portions being connected to said body portion.

6. The trap as set forth in claim 5, wherein said bottom member comprises a planar piece of mesh material having a plurality of corners, said planar piece of mesh material being folded upward at least at some of said corners to form said upwardly extending portions raised triangular portions, said raised triangular portions being connected to said body portion.

7. The trap as set forth in claim 1, wherein said first opening is formed in said circumferential body portion.

8. The trap as set forth in claim 1, wherein said second opening is formed in said circumferential body portion.

* * * * *